Figures 1, 2, 3, 4:
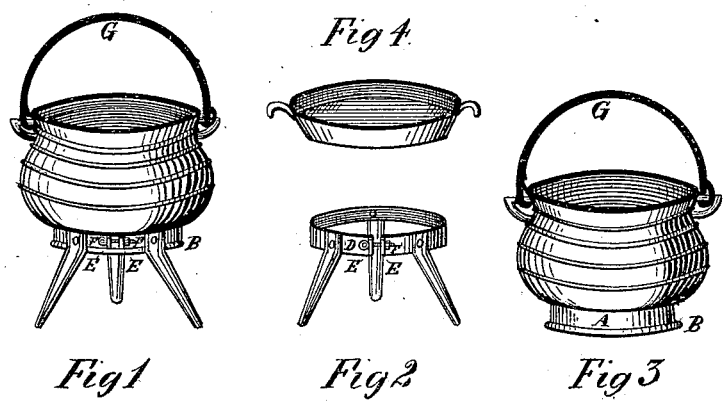

(No Model.)

J. V. HOPE.
METAL POT.

No. 251,230.

Patented Dec. 20, 1881.

Witnesses
Walter S. Dodge.
T. H. Law

Inventor
John Vernon Hope,
by Dodge & Son,
Attys.

UNITED STATES PATENT OFFICE.

JOHN V. HOPE, OF WEDNESBURY, COUNTY OF STAFFORD, ENGLAND.

METAL POT.

SPECIFICATION forming part of Letters Patent No. 251,230, dated December 20, 1881.

Application filed October 24, 1881. (No model.) Patented in England March 15, 1881.

*To all whom it may concern:*

Be it known that I, JOHN VERNON HOPE, of Wednesbury, in the county of Stafford, in the Kingdom of England, have invented new and useful Improvements in Metal Pots; and I do hereby declare that the following is a full, clear, and exact description of the invention, which will enable others skilled in the art to which it appertains to make and use the same.

Belly-pots as ordinarily constructed have three legs cast on them. These legs are very apt to snap off, carrying a piece of the pot with them. So great is the breakage from this cause that shippers decline to receive them when shipped in closed cases, even when the cases appear in good order and condition; and the amount of breakage in transit from this cause—on a consignment to the diamond fields, for instance—considerably increases the cost of the pots at their destination.

My invention consists in forming the legs of pots upon or securing them to a band of wrought or ductile metal separate from the pot, and providing said band with a clamping or binding device for securing it upon the pot, and in channeling that portion of the pot to which the band is applied, or in forming a bead at the lower edge thereof, to prevent the accidental slipping off of the band. This construction permits the legs to be removed for shipping, and the pot to be used upon a stove in the ordinary way, or to stand upon its legs, for use over an open fire.

Figure 1 shows a belly-pot complete; Fig. 2, stand; Fig. 3, pot destitute of stand, and Fig. 4 a frying-pan used in place of a lid.

In these pots it will be noticed is a projecting rim or downward flange, A, similar to those now used in cook-stoves, only with a bead, B, at the bottom projecting outward. The legs of wrought-iron or other tough metal are riveted to a band, D, which is fixed, when required, around the aforesaid rim or downward flange A. I construct this band with two lugs, E, and a screw, F, to tighten it on the pot, or use other equivalent fastening. When the pot is wanted to be used with legs the band D is placed round the downward flange A, fitting on just above the bead B, and is screwed tight. It is now fixed for use. To adapt it for a stove-pot I take off the legs with their accompanying band, and it becomes an ordinary stove-pot.

The upper edge of the pot is inclined outward to fit an ordinary frying-pan, Fig. 4, and this I use in place of a lid, and construct it with a pair of lugs instead of a handle, into which the handle G of the pot can be hooked, so as to suspend it over the fire; or it can be placed on the leg-stand, Fig. 2, and the fire placed beneath it.

The arrangement of legs can be used for almost all kinds of pots besides belly-pots.

I am aware that a vessel for heating liquids has been patented in which the lower portion of the vessel, considerably reduced in diameter, is surrounded by a hollow annulus separated at one side and provided with a device whereby the annulus can be enlarged or contracted to admit or exclude a stratum of air between the annulus and the vessel, the annulus being provided with steam inlet and outlet to permit the passage of steam through the same for the purpose of heating the vessel. I am also aware that a metallic stand upon which an ordinary pot may be supported has likewise been patented; but I make no claim to these features, broadly considered.

As above stated, my invention is designed to overcome the loss from breakage incident to the casting of legs or feet directly upon pots, and to furnish a supporting device which can be readily applied and securely fastened to pots of the usual dimensions and style.

It is essential that the band to which the legs are secured be formed of a tough, malleable, or ductile metal, it being apparent that if made of cast-iron, as is the hollow annulus of the device above referred to, the danger of breakage would be very great, the bands being detached for shipment. It is important, also, that a bead or equivalent shoulder be formed to prevent the accidental escape of the band from the pot. This I believe has not hitherto been done.

I claim as my invention—

1. As a new article of manufacture, an iron pot constructed with downward-projecting flange A and bead B in such manner that it can be used as a pot to fit into a stove or be itself fitted with a band carrying legs, substantially as described.

2. As a new article of manufacture, a stand consisting of a tough or ductile metallic band, D, armed with lugs and bolt, to attach it to a cylindrical surface, and legs riveted or otherwise fastened on, substantially as and for the purposes described.

3. The pot having a downward flange, A, channeled out so as to form a groove, into which a strap carrying legs and capable of being expanded and contracted in diameter is made to fit, for the purposes described.

4. The herein-described attachment for pots, consisting of the wrought iron or steel band D, provided with a clamping device, and having legs firmly secured upon it, substantially as set forth.

JOHN VERNON HOPE.

Witnesses:
JOHN NEVE,
ELIAS HY. JARVIS.